(12) United States Patent
Burlingame et al.

(10) Patent No.: US 8,656,202 B2
(45) Date of Patent: Feb. 18, 2014

(54) METHOD AND SYSTEM FOR MANAGING PLUG NETWORK BASED ON APPLIANCE IDENTIFICATION

(75) Inventors: John J. Burlingame, Camas, WA (US); Craig Thompson Whittle, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 258 days.

(21) Appl. No.: 13/068,796

(22) Filed: May 20, 2011

(65) Prior Publication Data

US 2012/0297227 A1 Nov. 22, 2012

(51) Int. Cl.
 *G06F 1/28* (2006.01)
(52) U.S. Cl.
 USPC ........... 713/340; 713/300; 713/310; 713/320; 713/321; 713/322; 713/323; 713/324; 713/330; 706/12
(58) Field of Classification Search
 USPC ................. 713/300, 310, 320–324, 330, 340; 706/12
 See application file for complete search history.

(56) References Cited

U.S. PATENT DOCUMENTS

| | | | | |
|---|---|---|---|---|
| 6,049,879 | A | 4/2000 | Davis et al. | 713/300 |
| 8,156,055 | B2 * | 4/2012 | Shimada et al. | 706/12 |
| 8,301,625 | B2 * | 10/2012 | Sugaya | 707/723 |
| 2004/0063405 | A1 * | 4/2004 | Song | 455/41.2 |
| 2006/0089987 | A1 * | 4/2006 | Igarashi et al. | 709/225 |
| 2006/0227884 | A1 * | 10/2006 | Koga et al. | 375/257 |
| 2007/0155349 | A1 | 7/2007 | Nelson et al. | 455/128 |
| 2010/0070217 | A1 | 3/2010 | Shimada et al. | 702/62 |
| 2010/0174419 | A1 | 7/2010 | Brumfield et al. | 700/295 |
| 2010/0191487 | A1 | 7/2010 | Rada et al. | 702/60 |
| 2010/0257158 | A1 * | 10/2010 | Sugaya | 707/723 |
| 2010/0280978 | A1 * | 11/2010 | Shimada et al. | 706/12 |
| 2012/0016608 | A1 * | 1/2012 | Ko et al. | 702/62 |
| 2013/0013593 | A1 * | 1/2013 | Sugaya | 707/723 |
| 2013/0013594 | A1 * | 1/2013 | Sugaya | 707/723 |

FOREIGN PATENT DOCUMENTS

GB 2465638 6/2010 ............. G01R 22/06

* cited by examiner

*Primary Examiner* — M Elamin
(74) *Attorney, Agent, or Firm* — Scot A. Reader

(57) ABSTRACT

A method and system for managing a plug network based on appliance identification. In a basic implementation, when a new appliance is activated on the plug network, a power usage profile for the new appliance is computed based on current and voltage measurements. The new appliance is classified into an appliance class based on the power usage profile. A power management action message respecting the new appliance is generated based on the class and is outputted. By judiciously configuring the power management actions applicable to different appliance classes, a business can monitor which types of appliances are attached by employees to power outlets and/or set the terms and conditions under which such appliances operate.

12 Claims, 5 Drawing Sheets

METHOD AND SYSTEM FOR MANAGING PLUG NETWORK BASED ON APPLIANCE IDENTIFICATION

BACKGROUND OF THE INVENTION

The present invention relates to commercial power management and, more particularly, management of a plug network at a business premises.

Many businesses are looking for ways to save electricity at their premises. Plug loads from appliances attached by employees to power outlets at their workspaces are a significant driver of power usage at business premises. Accordingly, it would be desirable for businesses to be able to regulate which appliances are attached by employees to power outlets at their workspaces. For example, a business might want to allow employees to use lamps at their workspaces, but prevent them from using fans, refrigerators, space heaters and coffee makers at their workspaces.

One way that a business might try to regulate which appliances are attached to power outlets at employee workspaces is to announce a company policy. However, simply announcing a company policy does not ensure compliance as employees might ignore or misinterpret the company policy.

A business might attempt to enforce the company policy by conducting workspace inspections. For example, the business might enlist inspectors to walk-around and check employee offices and cubicles for compliance. However, this requires hiring or designating inspectors and may be distracting and even embarrassing to employees whose workspaces are being inspected. Moreover, there is no guarantee that employees will remain compliant between inspections.

SUMMARY OF THE INVENTION

The present invention provides a method and system for managing a plug network based on appliance identification. In a basic implementation, when a new appliance is activated on the plug network, a power usage profile for the new appliance is computed based on current and voltage measurements. The new appliance is classified into an appliance class based on the power usage profile. A power management action message respecting the new appliance is generated based on the class and is outputted. By judiciously configuring the power management actions applicable to different appliance classes, a business can monitor which types of appliances are attached by employees to power outlets and/or set the terms and conditions under which such appliances operate.

In one aspect of the invention, a power manager comprises at least one network interface and at least one processor communicatively coupled with the interface, wherein the power manager receives current and voltage measurements via the interface, wherein the power manager under control of the processor computes an individual power usage profile for a new appliance based on the current and voltage measurements, classifies the new appliance into an appliance class based on the individual profile and generates a power management action message respecting the new appliance based on the class, and wherein the power manager outputs the message via the interface.

In some embodiments, the new appliance is plugged into a power outlet within a group of power outlets, the current and voltage measurements are associated with the group, and the power manager under control of the processor computes a group power usage profile for the group based on the measurements and computes the individual profile based on a change in the group profile.

In some embodiments, the group profile comprises a group transfer function.

In some embodiments, the group profile is computed using an adaptive infinite impulse response (IIR) filter.

In some embodiments, the individual profile comprises an individual transfer function.

In some embodiments, the power manager classifies the new appliance into the class based on computing a frequency response for the new appliance using the individual profile and determining that the frequency response for the new appliance matches a frequency response for the class.

In some embodiments, the power manager generates the message based further on an identity of a device that powers the new appliance.

In some embodiments, the message indicates to control a power state of the new appliance.

In some embodiments, the message indicates to control the power state by one of turning-off the new appliance, dimming the new appliance, placing the new appliance into a standby mode, placing the new appliance into a hibernation mode or implementing a thermostatic change on the new appliance.

In some embodiments, the message indicates to output a status notification respecting the new appliance.

In some embodiments, the message indicates to output the status notification by displaying the status notification on a user interface.

In another aspect of the invention, a power management method comprises the steps of receiving, by a power manager, current and voltage measurements; computing, by the power manager, an individual power usage profile for a new appliance based on the current and voltage measurements; classifying, by the power manager, the new appliance to an appliance class based on the individual profile; generating, by the power manager, a power management action message respecting the new appliance based on the class; and outputting, by the power manager, the message.

In yet another aspect of the invention, a power management system comprises a status and control unit, a power management console and a power manager communicatively coupled with the status and control unit and the power management console, wherein the power manager receives from the status and control unit current and voltage measurements, computes an individual power usage profile for a new appliance based on the current and voltage measurements, classifies the new appliance into an appliance class based on the individual profile, generates a power management action message respecting the new appliance based on the class, and outputs the message to at least one of the status and control unit or the power management console.

In some embodiments, the status and control unit receives the message and in response controls a power state of the new appliance.

In some embodiments, the power management console receives the message in response displays a status notification respecting the new appliance.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
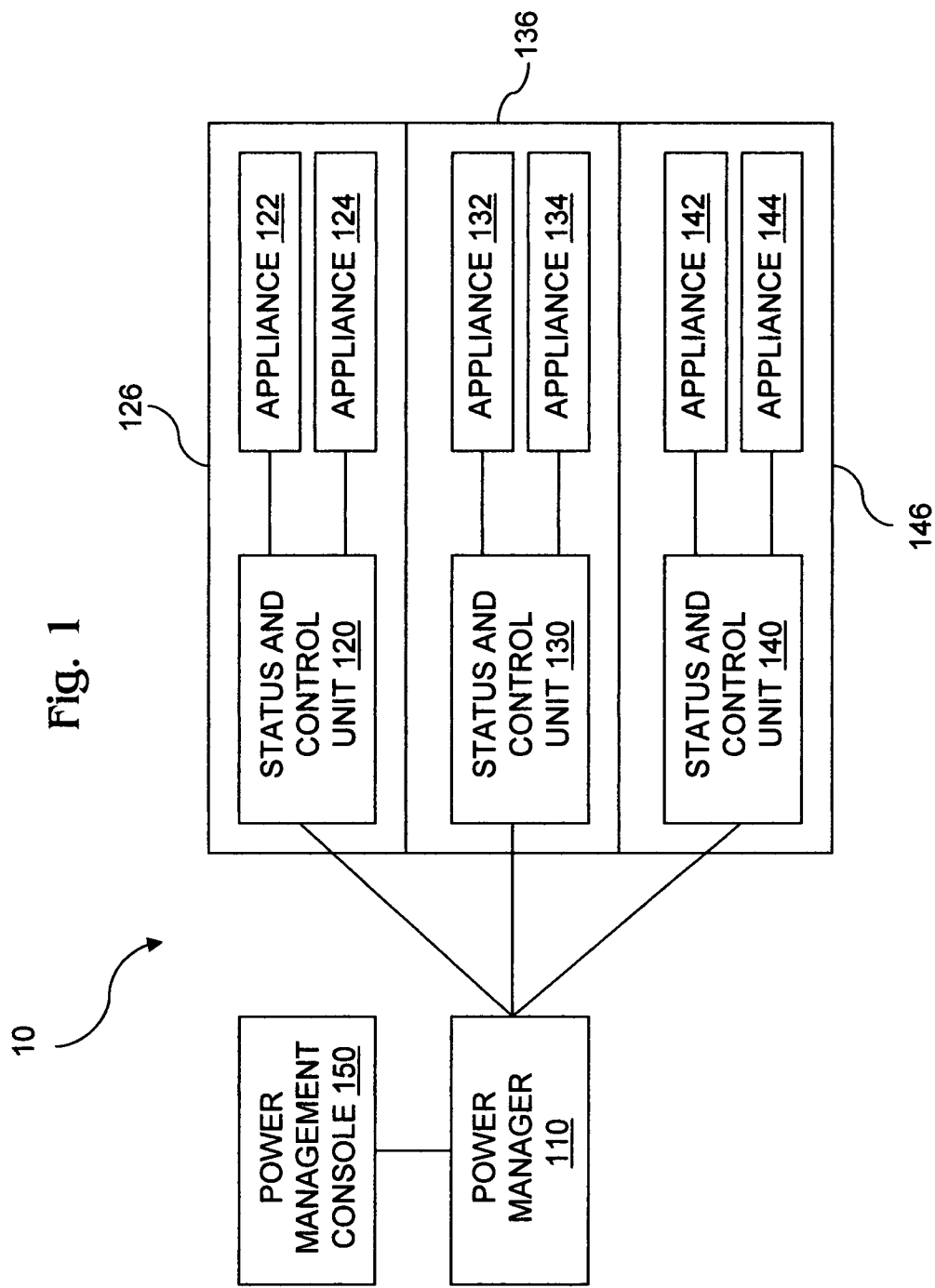
FIG. 1 shows a power management system in some embodiments of the invention.

FIG. 1 shows a power management system 10 in some embodiments of the invention. System 10 includes a power manager 110 communicatively coupled with status and control units 120, 130, 140 and a power management console 150. Manager 110 and units 120, 130, 140 communicate using one or more wired (e.g., Ethernet) and/or wireless (e.g., Wi-Fi, ZigBee) protocols. Manager 110 and console 150 communicate using one or more wired and/or wireless protocols. In some embodiments, manager 110 and console 150 communicate remotely over the Internet.

Units 120, 130, 140 are installed at workspaces 126, 136, 146, such as offices or cubicles at a business premises. Units 120, 130, 140 power and monitor appliances 122, 124, 132, 134, 142, 144. In the illustrated embodiment, unit 120 powers and monitors appliances 122, 124, unit 130 powers and monitors appliances 132, 134 and unit 140 powers and monitors appliances 142, 144. Appliances 122, 124, 132, 134, 142, 144 may include various types of devices having power plugs, such as audio cassette players, coffee makers, calculators, cell phones, clocks, compact disc players, desktop computers, digital video disc players, fans, fax machines, lamps, landline phones, lights, microwave ovens, multifunction peripherals (MFP), netbook computers, notebook computers, pencil sharpeners, personal data assistants (PDA), printers, radios, refrigerators, scanners, smart phones, space heaters, speakers, televisions and video cassette players. Of course, these specifically identified appliance types, as well as the number of status and control units and appliances shown in system 10, are purely exemplary and may vary in different embodiments.

Figure 2:
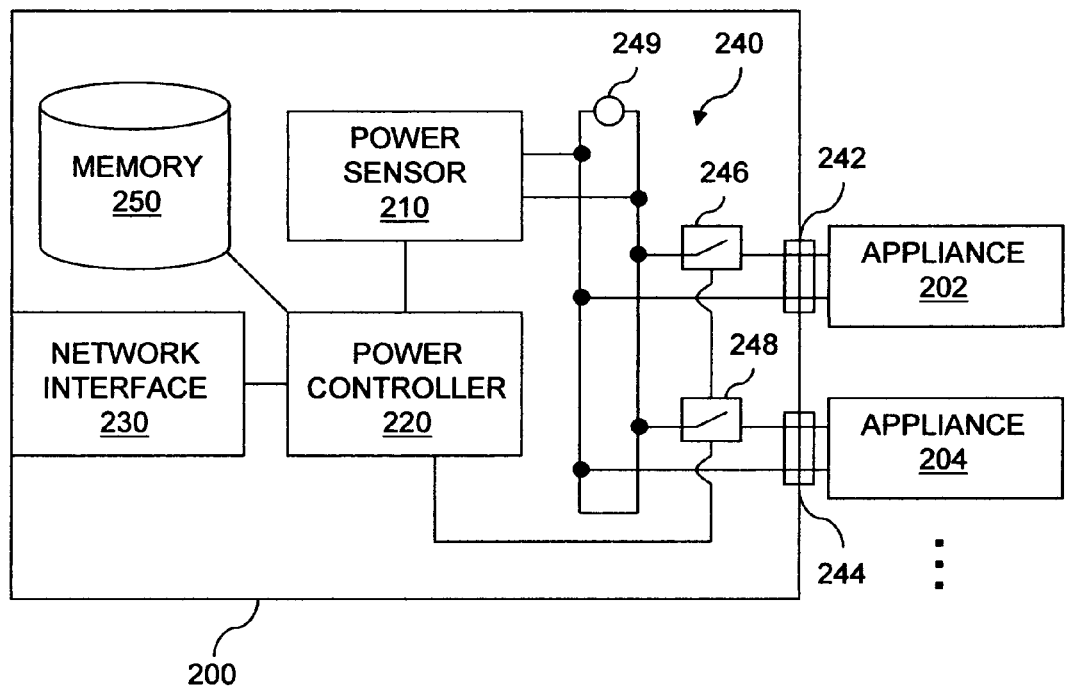
FIG. 2 shows a status and control unit in some embodiments of the invention.

FIG. 2 shows a status and control unit 200 in some embodiments of the invention. Unit 200 has a power controller 220 operatively coupled between a power sensor 210, a network interface 230, a power strip 240 and a memory 250.

Sensor 210 continually senses voltages on strip 240. Sensor 210 includes a voltage divider and a current-sensing resistor. The voltage divider reduces the peak-to-peak voltage (e.g., 170 V) on strip 240 to a level appropriate for sampling by controller 220. The current-sensing resistor is a low resistance (e.g., 0.2 ohm) resister inserted at a break in the neutral line that creates a small voltage drop for sampling by controller 220. Sensor 210 also includes one or more activity sensors that sense when an appliance plugged-in to strip 240 is activated.

Controller 220 continually measures the current and voltage on strip 240 by sampling. Controller 220 samples the voltage drop across the current-sensing resister on sensor 210 and generates current measurements for strip 240 from the sampled voltage drop and known resistance. Controller 220 also samples the divided voltage on sensor 210 and generates voltage measurements for strip 240 based on the sample and the known level of division. Controller 220 time-stamps the current and voltage measurements and stores them in memory 240. The sampling rate is variable. When appliances plugged-in to strip 240 are active (as inferred from voltage and/or current measurements), a higher sampling rate is used to ensure that the Nyquist rate is met for the frequencies of interest.

Controller 220 generates and transmits to manager 110 via interface 230 status messages. Status messages include time-stamped current and voltage measurements for strip 240. Status messages also include time-stamped indications of when a new appliance is activated on strip 240. Status messages are generated in a format expected by manager 110 and include a status and control unit identifier sufficient to identify unit 200 as the message source. In some embodiments, unit 200 also includes presence sensors [e.g., ultrasonic, radio frequency identification (RFID), sound, infrared, Bluetooth signal strength, etc.] that detect whether the worker in whose workspace unit 200 is installed is at the workspace and communicate this to manager 110 in status messages. This allows manager 110 to take the worker's presence at the workspace into consideration when determining power management actions.

Controller 220 processes power management action messages received from manager 110 via interface 230 and controls the power state of appliances plugged-in to strip 240 based on power management action messages. For example, in response to receiving a message indicating to turn-off appliance 202, controller 220 may change the state of a solid state relay switch 246 and render inoperative a power outlet 242 to which appliance 202 is attached. Conversely, in response to receiving a message indicating to reinstate operability of outlet 242, controller 220 may change the state of switch 246 and return outlet 242 to an operative state.

In some embodiments, controller 220 is implemented in an ATmega128 microcontroller integrated circuit marketed by Atmel Corporation and is isolated from the high voltage of strip 240 using opto-isolators.

Strip 240 includes a group of power outlets adapted to receive power plugs tethered to or otherwise exposed on appliances. Strip 240 also includes a power source 249 for supplying power to appliances via the power outlets. Strip 240 further includes solid state relay switches for controlling the supply of power to appliances via the power outlets, depending on the state of switches. While strip 240 is shown to include two power outlets 242, 244, two appliances 202, 204 and two solid state relay switches 246, 248 in the interest of simplicity, the number of power outlets, appliances and solid state relay switches associated with a power strip may vary in different embodiments and will often be greater than two.

In some embodiments, a status and control unit may have a different configuration that enables the unit to make additional or different types of changes to the power state of appliances in response to power management action messages, such as dimming an appliance, placing an appliance into a standby mode, placing an appliance into a hibernation mode and/or effecting a thermostatic change on an appliance. Moreover, in some embodiments, a status and control unit powers and monitors a single power outlet.

Figure 3:
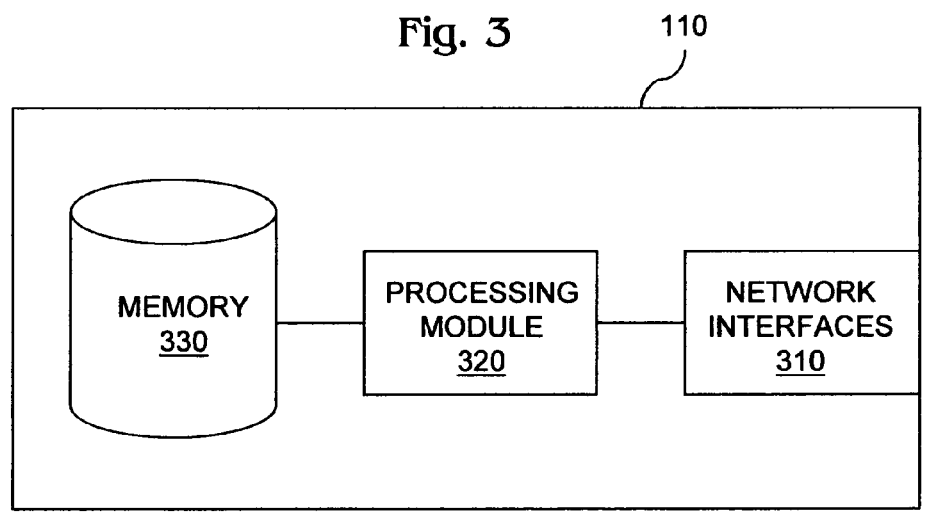
FIG. 3 shows a power manager in some embodiments of the invention.
Figure 4:
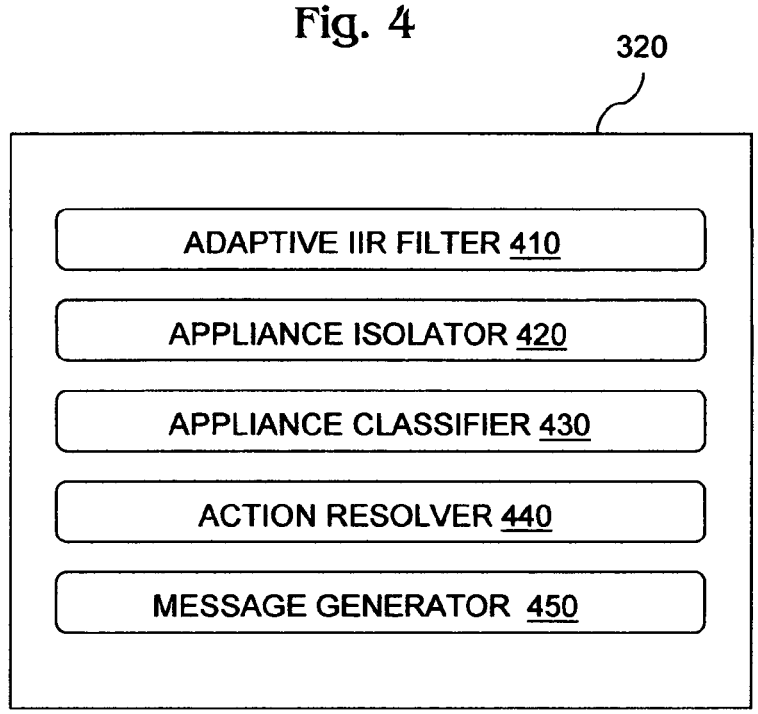
FIG. 4 shows functional elements of a power manager in some embodiments of the invention.

FIG. 3 shows manager 110 in some embodiments of the invention. Manager 110 has a processing module 320 operatively coupled between one or more network interfaces 310 and a memory 330. Functional elements operative on module 320 are shown in FIG. 4 in some embodiments of the invention to include an adaptive IIR filter 410, an appliance isolator 420, an appliance classifier 430, an action resolver 440 and a message generator 450. In some embodiments, processing module 320 includes a microprocessor and elements 410-450 are software programs executed by the microprocessor. In other embodiments, one or more of elements 410-450 or a portion thereof are implemented by a microcontroller or custom circuitry. For example, processing module 320 may be implemented as a single-board computer running an embedded Linux operating system coupled via a universal serial bus (USB) interface with a microcontroller daughter board. Memory 330 includes an appliance profile database and a management action database.

Figure 5:
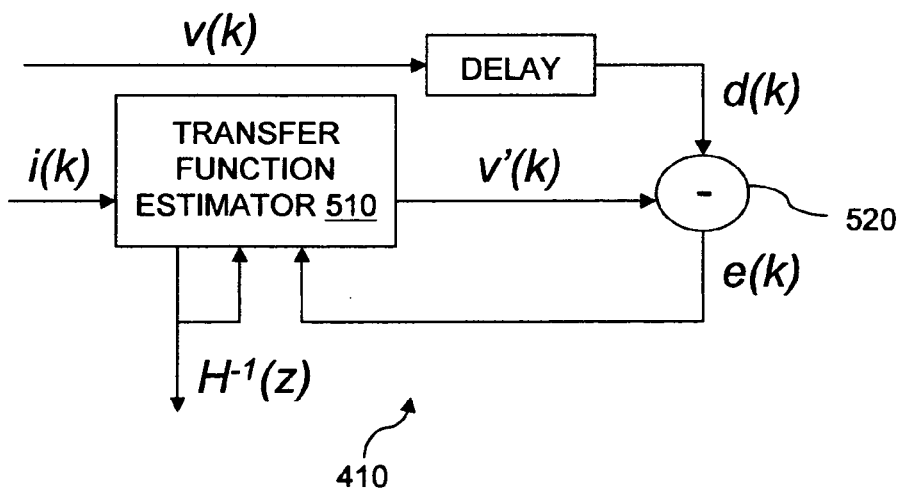
FIG. 5 shows an adaptive IIR filter in some embodiments of the invention.

Filter 410 computes group power usage profiles for groups of power outlets monitored by units 120, 130, 140 in the form of group transfer functions. A functional rendering of filter 410 is provided in FIG. 5 and will be described in relation to processing of current and voltage measurements received from unit 200 to determine a group transfer function for strip 240. The output of filter 410 is a current-to-voltage (inverse impedance) transfer function $H^{-1}(z)$ where $$H(z) = \frac{B(z)}{A(z)} = \frac{\sum_{q=0}^{M} z^{-q} b_q}{\sum_{p=0}^{N} z^{-p} a_p} = \frac{b_0 + z^{-1} b_1 + \ldots + z^{-M} b_M}{a_0 + z^{-1} a_1 + \ldots + z^{-N} a_N}$$

and $a_p$, $b_q$ are transfer function coefficients that are updated in feedback loop based on a voltage error. At the outset, a current measurement i(k) and voltage measurement v(k) for strip 240 are received and an initial group transfer function $H^{-1}(z)_0$ is computed by a transfer function estimator 510 using initial transfer function coefficients $a_0$, $b_0$. An initial voltage estimate v'(k) is then computed based on Ohm's law using the initial group transfer function $H^{-1}(z)_0$ and the current measurement i(k). The difference between the initial voltage estimate v'(k) and a delayed voltage measurement d(k) is then computed by a subtractor 520 to obtain an initial voltage error e(k). A delayed voltage measurement d(k) is used in lieu of an instantaneous voltage measurement v(k) to synchronize the current and voltage measurements that are applied in generating the voltage error e(k). The initial voltage error e(k) is applied as feedback to transfer function estimator 510 to generate updated transfer function coefficients $a_1 b_1$. An updated group transfer function $H^{-1}(z)_1$ is then computed by transfer function estimator 510 using the initial group transfer function $H^{-1}(z)_0$ and updated transfer function coefficients $a_1$, $b_1$. This iterative process continues until a reliable group transfer function $H^{-1}(z)$ is produced. Reliability of the group transfer function $H^{-1}(z)$ is presumed when the voltage error e(k) is reduced to a tolerable level. In some embodiments, filter 410 is a direct form IIR filter and the transfer function coefficients are updated according to a least mean squared (LMS) IIR algorithm of the general form $$\vec{b}_{n+1} = (1 - \varsigma_b \mu_b) \vec{b}_n + 2\mu_b e_n \frac{\vec{x}_n}{\|\vec{x}_n\|}$$

$$\vec{a}_{n+1} = (1 - \varsigma_a \mu_a) \vec{a}_n - 2\mu_a e_n \frac{\vec{y}_n}{\|\vec{d}_n\|}$$

where $x_n$ is the filter input, $y_n$ is the filter output, $\varsigma$ is a leakage factor, $\mu$ is an update rate control value, $e_n$ is a filter estimation error and $d_n$ is the delayed counterpart to the filter output.

Isolator 420 computes individual power usage profiles for new appliances activated on units 120, 130, 140 in the form of individual transfer functions. Operation of isolator 420 will be described in relation to computation of an individual power usage profile for a new appliance activated on strip 240 of unit 200. The group transfer function $H_{Total}^{-1}(z)$ for strip 240 is expressed in the formula $$\frac{1}{H_{Total}(z)} = \frac{1}{H_1(z)} + \frac{1}{H_2(z)} \ldots + \frac{1}{H_n(z)}$$

where $H_1(z)$ is the individual transfer function of a first appliance on strip 240, $H_2(z)$ is the individual transfer function of a second appliance on strip 240 and $H_n(z)$ is the individual transfer function of an nth appliance on strip 240. Isolator 420 computes an individual transfer function for a new appliance on strip 240 $H_{new}(z)$ based on a change between the group transfer function for strip 240 before activation of the new appliance $H_{prev}(z)$ and after activation of the new appliance $H_{curr}(z)$, as follows:

$$H_{new}(z) = \frac{B_{prev}(z) B_{curr}(z)}{B_{prev}(z) A_{curr}(z) - B_{curr}(z) A_{prev}(z)}.$$

Classifier 430 classifies new appliances activated on units 120, 130, 140 into appliance classes based on the individual transfer functions for the new appliances computed by isolator 420. Classifier 430 computes the frequency response for $H_{new}(z)$, that is, $H_{new}(e^{jw})$, by replacing z with $e^{jw}$ and evaluating around the unit circle. Classifier 440 then retrieves from an appliance profile database in memory 330 predefined profiles associated with various types of appliances. Each appliance profile includes a frequency response for a transfer function for an appliance type k in the form $H_k(e^{jw})$. Classifier 440 compares the new appliance for a match with various appliance types by computing a distance $d_{min}$ between $H_{new}(e^{jw})$ and $H_k(e^{jw})$ for various appliance types according to $$d_{min} = [H_{new}(e^{jw}) - H_k(e^{jw})]^T * [H_{new}(e^{jw}) - H_k(e^{jw})] \leq V_{th}$$

where T is the hermitian transpose. Classifier 440 declares a match with an appliance type k if the distance $d_{min}$ is within a threshold distance $V_{th}$ for that appliance type. In response to declaring a match, classifier 440 associates the new appliance with a class identifier of the appliance type. If the new appliance does not match any appliance type, the new appliance is associated with a class identifier of an unknown appliance type.

Resolver 450 determines power management actions to be taken with respect to new appliances based on classifications made by classifier 440. In some embodiments, resolver 450 uses the class identifier associated with the new appliance to look-up a management action in a power management action database within memory 330. The management action may specify to control a power state of the new appliance by, for example, turning-off the new appliance, dimming the new appliance, placing the new appliance into a standby mode, placing the new appliance into a hibernation mode or implementing a thermostatic change on the new appliance. Alternatively, the management action may specify to output a status notification respecting the new appliance, for example, by displaying a status notification respecting the new appliance on a user interface of console 150. In other embodiments, resolver 450 combines the class identifier of the new appliance with other information, such as a status and control unit identifier of the one of units 120, 130, 140 that powers and monitors the new appliance, to determine a management action. In this regard, different management actions may be specified in the management action database for different status and control units. For example, the unit identifier may be used to look-up a management action profile applicable to the unit and the class identifier may be used to look-up a unit-specific management action. In that way, different management actions may be taken depending on the workspace in which the unit is installed. In still other embodiments, the unit identifier is used to look-up an identity of a user at whose workspace the unit is installed and the user identity is applied in conjunction with the class identifier to resolve a power management action. In that way, different management actions may be taken depending on the user involved.

Naturally, resolver 450 may determine power management actions based on other and further considerations, such as the presence of a worker at the one of workspaces 126, 136, 146 where the affected one of units 120, 130, 140 is installed, the load on the plug network, the time of day and/or the day of week.

Message generator 460 generates and transmits via interfaces 310 power management action messages based on power management actions determined by resolver 450 and power management actions explicitly requested by the plug network administrator in action request messages received from console 150. Power management action messages are addressed and sent to units 120, 130, 140 or console 150, as appropriate. In some embodiments, power management action messages may be addressed and sent directly to a new appliance (e.g., transmitted directly to a computer to cause the computer to enter a hibernation mode). Power management action messages are generated in a format expected by the destination device to which they are addressed.

Console 150 includes a user interface having an input mechanism and an output mechanism. The output mechanism visually displays status notifications respecting new appliances received from manager 110 in power management action messages. Status notifications alert the plug network administrator about new appliances activated on the plug network. A status notification may identify, for example, the name of the user who activated the new appliance (presumed from the unit identifier), the unit to which the new appliance is attached and the class of the new appliance. The status notification may also indicate any power state control action that has been taken with regard to the new appliance. The input mechanism of the user interface accepts inputs. Thus, a plug network administrator in response to viewing a status notification may request that a power management action be taken. In that event, console 150 transmits an action request message to manager 110, which issues a power management action message to one of units 120, 130, 140 or directly to the new appliance to change the power state of the new appliance.

Figure 6:
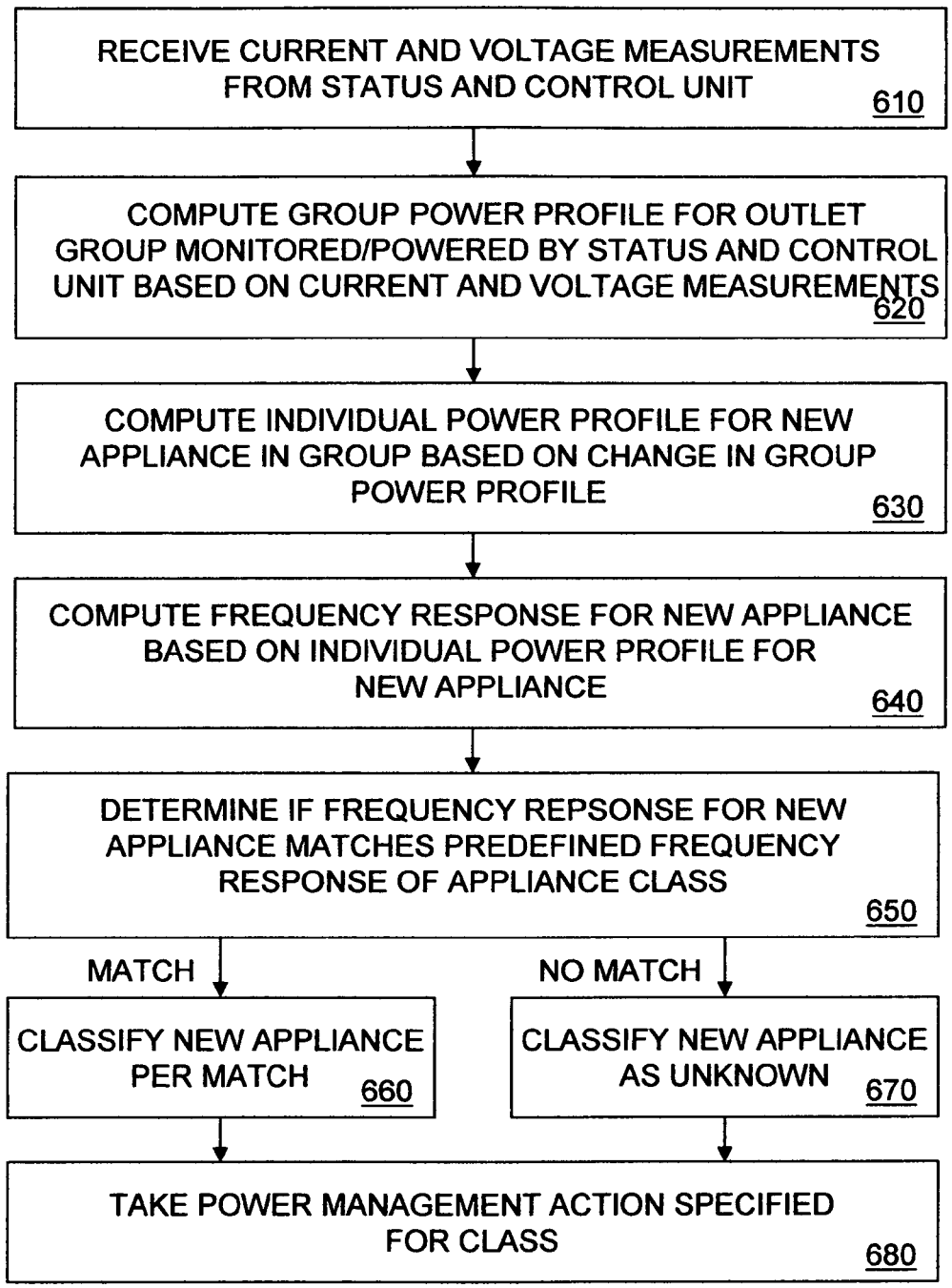
FIG. 6 shows a power management method performed by a power manager in some embodiments of the invention.

FIG. 6 shows a power management method performed by manager 110 in some embodiments of the invention. The method will be described in relation to an interaction between manager 110 and unit 200. At the outset, manager 110 receives from unit 200 current and voltage measurements for a group of power outlets monitored and powered by unit 200 (e.g., outlets 242, 244 associated with strip 240) (610). In some embodiments, status messages having time-stamped current and voltage measurements for the group are received, along with a status message indicating the time when a new appliance was activated within the group. Manager 110 then computes a group power profile for the group based on the current and voltage measurements (620). In some embodiments, the group power profile includes a group transfer function computed before a new appliance was activated and a group transfer function computed after the new appliance was activated. Manager 110 next computes an individual power profile for the new appliance based on a change in the group power profile (630). In some embodiments, the individual power profile includes an individual transfer function computed based on the group transfer function before the new appliance was activated and the group transfer function estimate after the new appliance was activated. Manager 110 then computes a frequency response for the new appliance based on the individual power profile (640). Manager 110 next determines whether the frequency response for the new appliance matches a predefined frequency response of any appliance class (650). If there is a match, manager 110 assigns the new appliance to the matching appliance class (660). If there is no match, manager 110 assigns the new appliance to the unknown appliance class (670). In either event, manager 110 takes a power management action indicated for the assigned class (680). In particular, manager 110 resolves the appliance class to a power management action and outputs a power management action message to implement the action.

Figure 7:
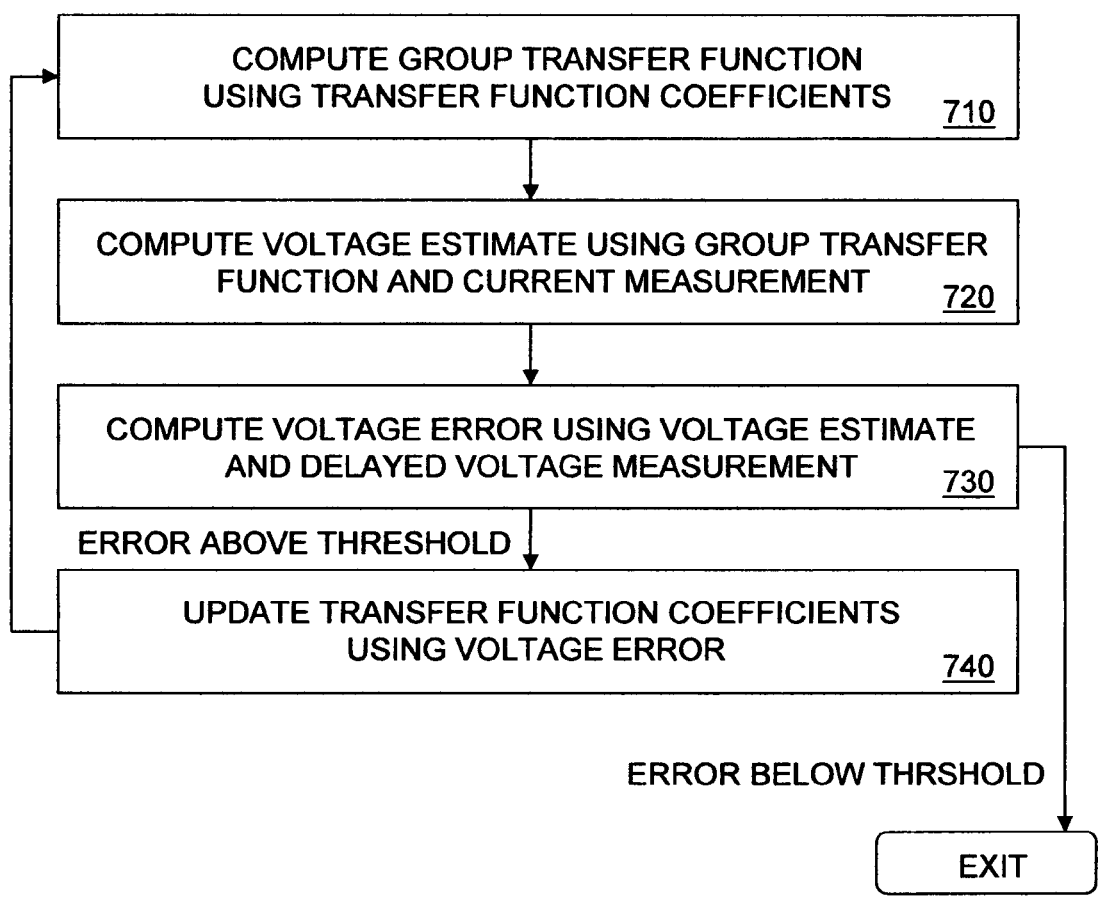
FIG. 7 shows a group transfer function computation method performed by a power manager in some embodiments of the invention.

FIG. 7 shows a group transfer function computation method performed by manager 110 in some embodiments of the invention. The method will be described in relation to an interaction between manager 110 and unit 200. Manager 110 computes a group transfer function using transfer function coefficients (710). Manager 110 then computes a voltage estimate using the group transfer function and a current measurement received from unit 200 (720). Manager 110 then computes a voltage error using the voltage estimate and a delayed voltage measurement received from unit 200 (730). Manager 110 then determines whether the voltage error is below a predefined error threshold. If the voltage error is not below threshold, manager 110 updates the transfer function coefficients using the voltage error (740) and returns to Step 710. If the voltage error is below threshold, the process flow is terminated.

It will be appreciated by those of ordinary skill in the art that the invention can be embodied in other specific forms without departing from the spirit or essential character hereof. The present description is thus considered in all respects to be illustrative and not restrictive. The scope of the invention is indicated by the appended claims, and all changes that come with in the meaning and range of equivalents thereof are intended to be embraced therein.

What is claimed is:

1. A power manager, comprising:
   at least one network interface; and
   at least one processor communicatively coupled with the interface, wherein the power manager is configured to receive current and voltage measurements via the interface, wherein the power manager under control of the processor is configured to compute an individual transfer function for a new appliance using the current and voltage measurements and an adaptive infinite impulse response filter, classify the new appliance into an appliance class based on the individual transfer function including computing a frequency response for the new appliance using the individual transfer function and comparing the frequency response with predefined frequency responses for different appliance classes and generate a power management action message respecting the new appliance based on the class, and wherein the power manager is configured to output the message via the interface.

2. The power manager of claim 1, wherein the new appliance is plugged into a power outlet within a group of power outlets, wherein the current and voltage measurements are associated with the group, and wherein the power manager under control of the processor is configured to compute a group transfer function for the group based on the measurements and compute the individual transfer function based on a change in the group transfer function.

3. The power manager of claim 1, wherein the power manager is configured to generate the message based further on an identity of a device that powers the new appliance.

4. The power manager of claim 1, wherein the message indicates to control a power state of the new appliance.

5. The power manager of claim 1, wherein the message indicates to output a status notification respecting the new appliance.

6. A power management method, comprising the steps of:
   receiving, by a power manager, current and voltage measurements;
   computing, by the power manager, an individual transfer function for a new appliance using the current and voltage measurements and an adaptive infinite impulse response filter;
   classifying, by the power manager, the new appliance to an appliance class based on the individual transfer function including computing a frequency response for the new appliance using the individual transfer function and comparing the frequency response with predefined frequency responses for different appliance classes;
   generating, by the power manager, a power management action message respecting the new appliance based on the class; and
   outputting, by the power manager, the message.

7. The method of claim 6, wherein the new appliance is plugged into a power outlet within a group of power outlets, wherein the current and voltage measurements are associated with the group, and wherein the computing step comprises the substeps of computing, by the power manager, a group transfer function for the group based on the measurements and computing, by the power manager, the individual transfer function based on a change in the group transfer function.

8. The method of claim 6, wherein the message is generated further based on an identity of a device that powers the new appliance.

9. The method of claim 6, wherein the message indicates to control a power state of the new appliance.

10. The method of claim 6, wherein the message indicates to output a status notification respecting the new appliance.

11. A power management system, comprising:
    a status and control unit;
    a power management console; and
    a power manager communicatively coupled with the status and control unit and the power management console, wherein the power manager is configured to receive from the status and control unit current and voltage measurements, compute an individual transfer function for a new appliance using the current and voltage measurements and an adaptive infinite impulse response filter, classify the new appliance into an appliance class based on the individual transfer function including computing a frequency response for the new appliance using the individual transfer function and comparing the frequency response with predefined frequency responses for different appliance classes, generate a power management action message respecting the new appliance based on the class, and output the message to at least one of the status and control unit or the power management console.

12. The system of claim 11, wherein the new appliance is plugged into a power outlet within a group of power outlets on the status and control unit, wherein the current and voltage measurements are associated with the group, and wherein the power manager under control of the processor is configured to compute a group transfer function for the group based on the measurements and compute the individual transfer function based on a change in the group transfer function.

\* \* \* \* \*